July 13, 1937. J. NEWMARK Re. 20,445

VALVE STEM HANDLE

Original Filed March 14, 1935

INVENTOR.
JOSEPH NEWMARK
BY John P. Chamberlain
his ATTORNEY.

Reissued July 13, 1937

Re. 20,445

UNITED STATES PATENT OFFICE 20,445

VALVE STEM HANDLE

Joseph Newmark, Jamaica, N. Y., assignor to Die Casting Corporation of America, Elmhurst, N. Y., a corporation of New York Original No. 2,043,418, dated June 9, 1936, Serial No. 11,055, March 14, 1935. Application for reissue March 22, 1937, Serial No. 132,347

5 Claims. (Cl. 287—53)

This invention relates to valve stem handles and has for one of its objects the provision of such a handle that may easily be assembled and disassembled from the valve stem with which it is to be used.

Another object of the invention is to provide a firm gripping connection between the stem and handle.

A further object of the invention is to provide a handle of this character which is adapted to be used with various sizes of valve stems.

A still further object of the inventon is to provide such a handle having an inner split bushing, the said bushing being provided with a pair of different sized threaded tapering coaxial openings for the reception of various sizes of valve stems, the said bushing forming a thread cutting die for the end of the valve stems.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure and the latter, therefore, is to be understood from an illustrative, rather than a restrictive standpoint.

The inventive idea involved is capable of receiving a variety of mechanical expressions, one of which, for the purpose of illustration is shown in the accompanying drawing, in which Figure 1 is a fragmental view in side elevation of a water faucet showing my improved handle as applied thereto.

Figure 1:
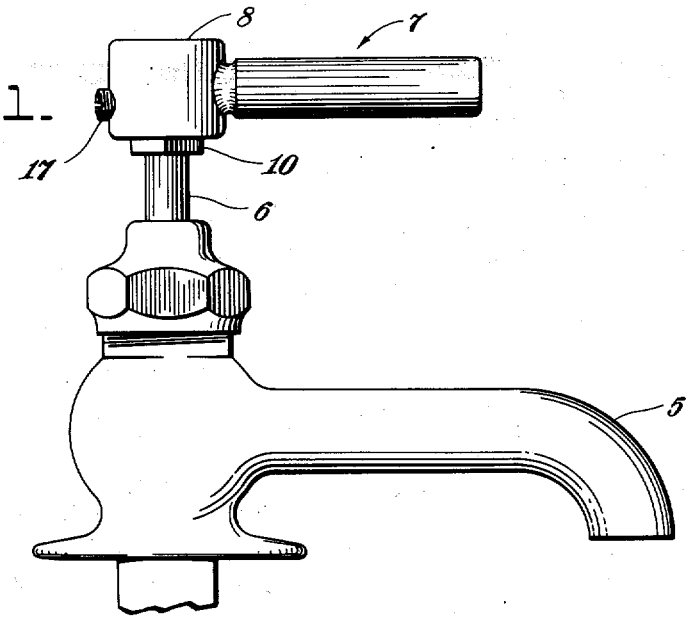

Referring now to the drawing in detail 5 indicates a water faucet having a valve stem 6 to which my improved handle 7 is secured.

The handle 7 includes a gripping portion extending from a hub 8 having a central opening therein that is preferably hexagonal in configuration, and nested in the opening in the form as shown is a hexagonal bushing or adapter 10. The bushing is provided with a longitudinal bore therethrough, which bore is designated by the reference numerals 11 and 12. The bore, which is threaded throughout its length, tapers inwardly from each end thereof. In other words, the bore has its smallest diameter substantially at its center and its larger diameters at its terminals, the portion 12 thereof having a larger diameter than the portion 11, which portion 12 being capable of receiving stems of greater diameter than the portion 11. By this construction, the handle can be used on valve stems of various sizes.

In practice, a valve stem below a certain diameter is inserted into the bushing through the smaller tapered portion 11 and those above are inserted through the larger portion 12.

Figure 2:
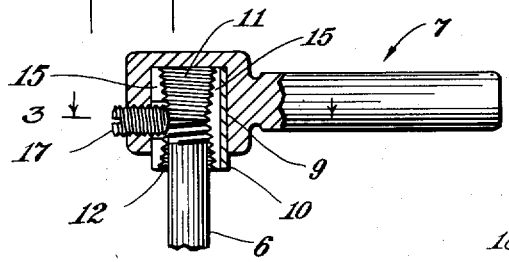
Figure 2 is a fragmental sectional view of the handle.
Figure 3:
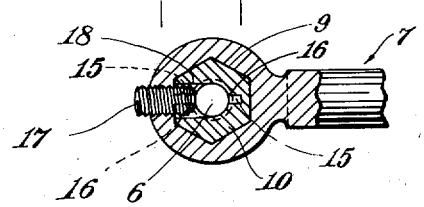
Figure 3 is a sectional view taken on line 3—3, Figure 2.
Figure 4:
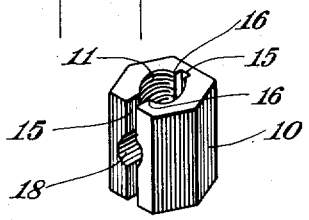
Figure 4 is a perspective view of the handle adapter.

The bushing 10 is longitudinally split by a slot 15, thereby forming a plurality of cutting edges 16, which edges are similar to the edges of a die for external thread cutting. Thus, as the bushing with the tapered, threaded bore 11—12 is screwed onto the unthreaded valve stem, the cutting edges formed by the opening cut the threads thereon, as shown in Fig. 2, thereby insuring a firm gripping connection between the stem and adapter. It will be understood that due to the split 15, the adapter 10 will slightly expand and bear tightly against the walls of the hexagonal opening 9 in the hub 8 when a valve stem is inserted therein.

A set screw 17 is threadedly maintained in the hub 8 and passes through an enlarged portion of the slot which constitutes a clearance opening 18 in the adapter 10 and is screwed against the surface of the valve stem 6 to further insure a firm contact between the handle and stem. The set screw 17 also prevents the adapter from falling out of the hub 8.

While I have shown and described the opening in the hub 8 and the adapter as hexagonal in cross section, I do not restrict myself to this shape as any other angularly shaped opening and adapter may just as readily be used to avoid relative rotation between the adapter and hub. I may if desirable use a circular hole and adapter and key same to the hub and in this way prevent rotation between the handle and adapter. The angular sided opening and adapter not only prevent relative rotation between the said parts but acts as means for aligning the clearance opening 15 in the adapter with the threaded screw opening in the hub to permit of the ready assembling of the various parts.

From the foregoing, it will be seen that I have provided a handle that may be firmly and readily attached to unthreaded valve stems that extend from either water, gas, air or steam valves.

Having described my invention, what I claim as new and desire to secure by Letters Patent is:

1. A handle having a hub portion adapted to be applied to valve stems, a longitudinally split bushing removably positioned within said hub portion, said bushing having a bore extending therethrough and tapering inwardly from the outer ends thereof, said bore being of a larger diameter at one end than at the other to receive stems of various sizes and being threaded whereby an unthreaded stem will be automatically threaded as it is inserted in the bushing and the latter being expanded by the stem to be frictionally held within the hub portion.

2. A handle having a hub portion adapted to be applied to valve stems, a longitudinally split bushing removably positioned within said hub portion, said bushing having a bore extending therethrough and tapering inwardly from the outer ends thereof, said bore being of a larger diameter at one end than at the other to receive stems of various sizes and being threaded whereby an unthreaded stem will be automatically threaded as it is inserted in the bushing and the latter being expanded by the stem to be frictionally held within the hub portion, and auxiliary means for locking said bushing to the stem.

3. In a device of the class described, the combination of a handle adapted to be applied to a valve stem, said handle being provided with a hub portion having a non-circular longitudinal opening therein, and a bushing having an exterior surface shaped to fit said opening and being removably positioned therein, the bushing having a threaded, longitudinal bore therein, the bore having its smallest diameter substantially midway between the ends thereof and becoming increasingly larger as it approaches each terminal thereof, the diameter of one of such terminal portions of the bore being larger than the other of such terminal portions, the bushing having an opening in the side walls thereof forming cutting edges for the threads of the bore, whereby, when the bushing is applied to an unthreaded valve stem a thread will be cut upon said stem.

4. A handle adapted to be applied to an unthreaded valve stem, the handle being provided with a hub portion having an opening therein, a bushing being positioned within said opening, the bushing having a threaded longitudinal bore therein, the bore having its smallest diameter substantially midway between the ends thereof and tapering outwardly at each end thereof, the bushing having an opening in the side walls thereof forming cutting edges for the threads in the bore, and a set screw in the side walls of the hub portion adapted to pass through the opening in the bushing and engage the valve stem positioned therein.

5. A handle adapted to be applied to a valve stem, the handle being provided with a hub portion having a non-circular longitudinal opening therein, a bushing being removably positioned within said opening, the external surface of the bushing being shaped to fit the opening in the hub portion, the bushing having a threaded longitudinal bore therein, the bore being tapered through substantially its entire length, the bushing having an opening in the side walls thereof forming cutting edges for the threads in the bore, the hub portion having a threaded opening in the side walls thereof and a set screw positioned in said threaded opening and adapted to secure the bushing within the hub portion.

JOSEPH NEWMARK.